Sept. 9, 1969  J. R. ANDERSON ET AL  3,465,522

ION ROCKET

Filed March 9, 1965  4 Sheets-Sheet 1

INVENTORS.
JOHN ROBERT ANDERSON,
GEORGE A. WORK,
BY John M. Koch
ATTORNEY.

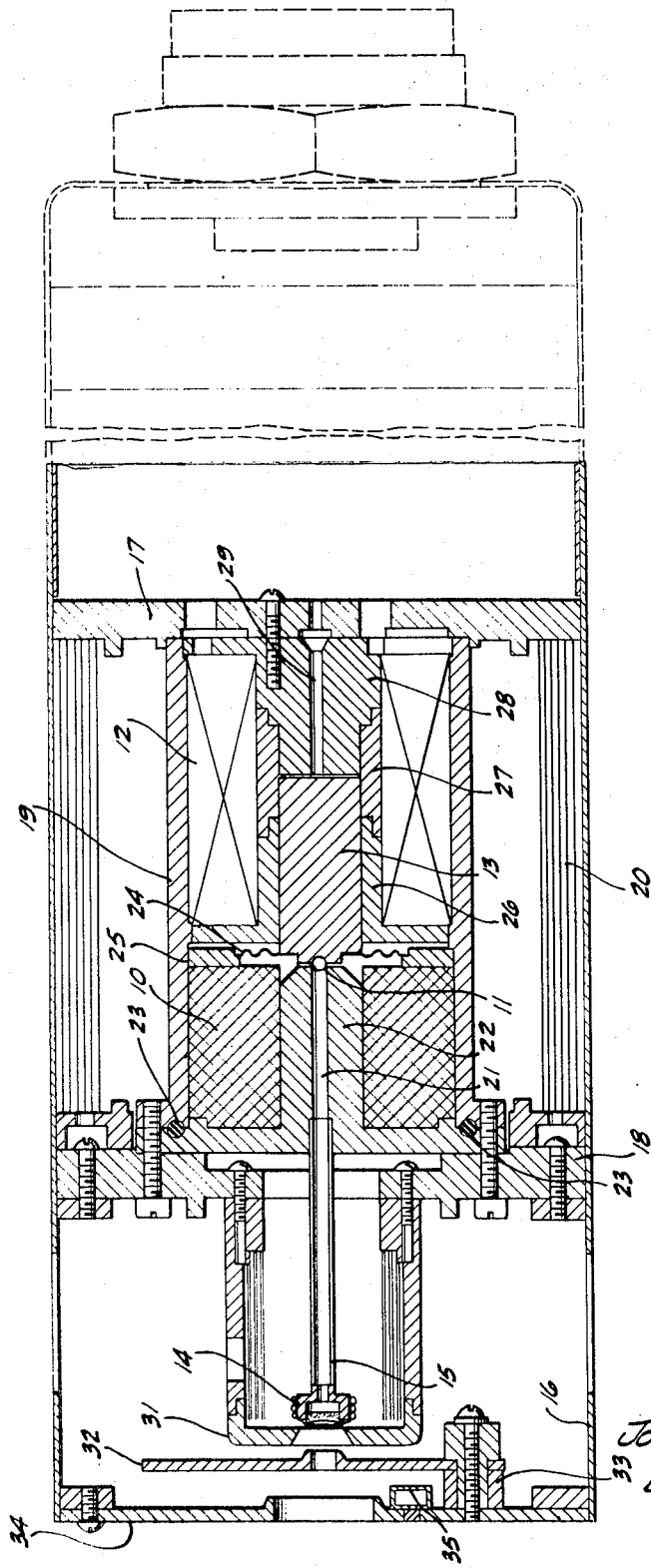

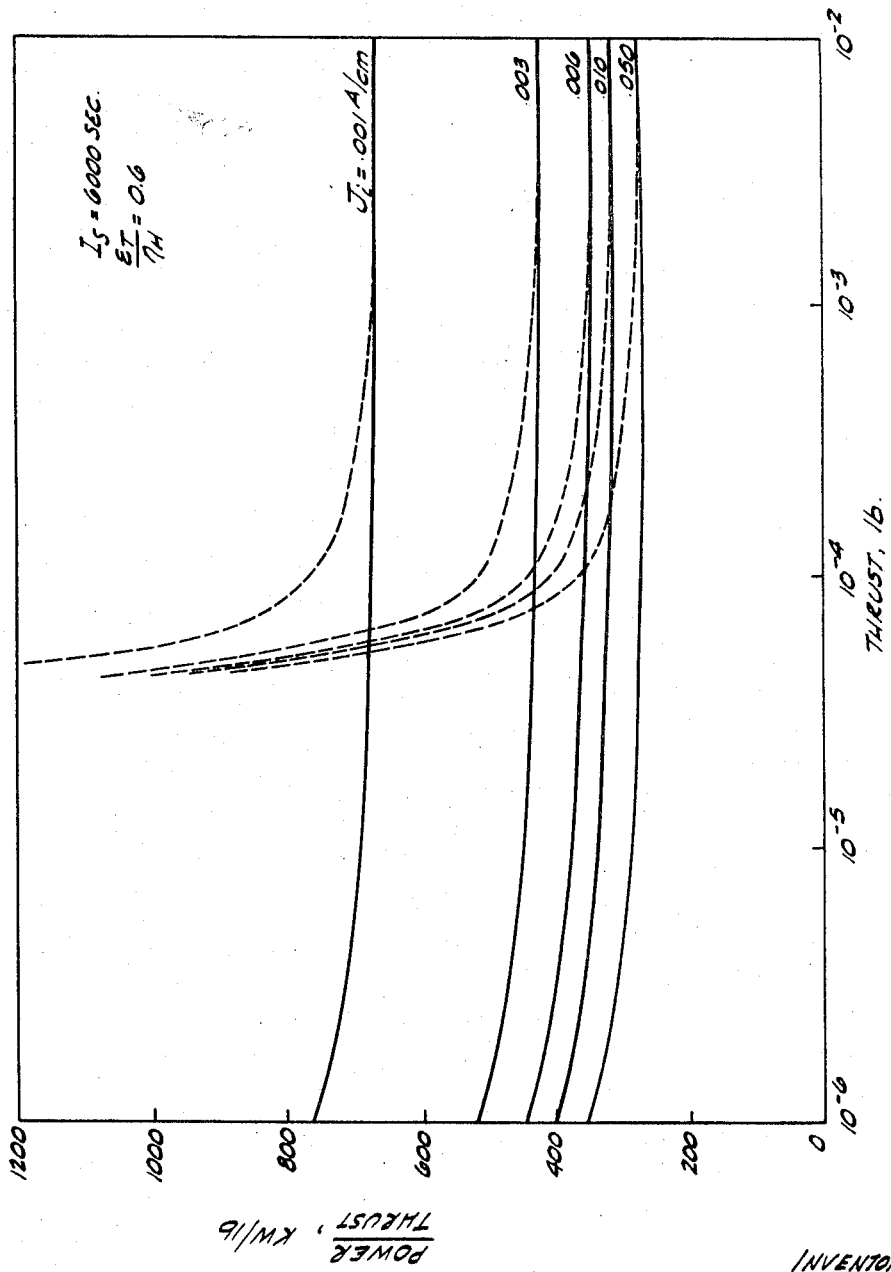

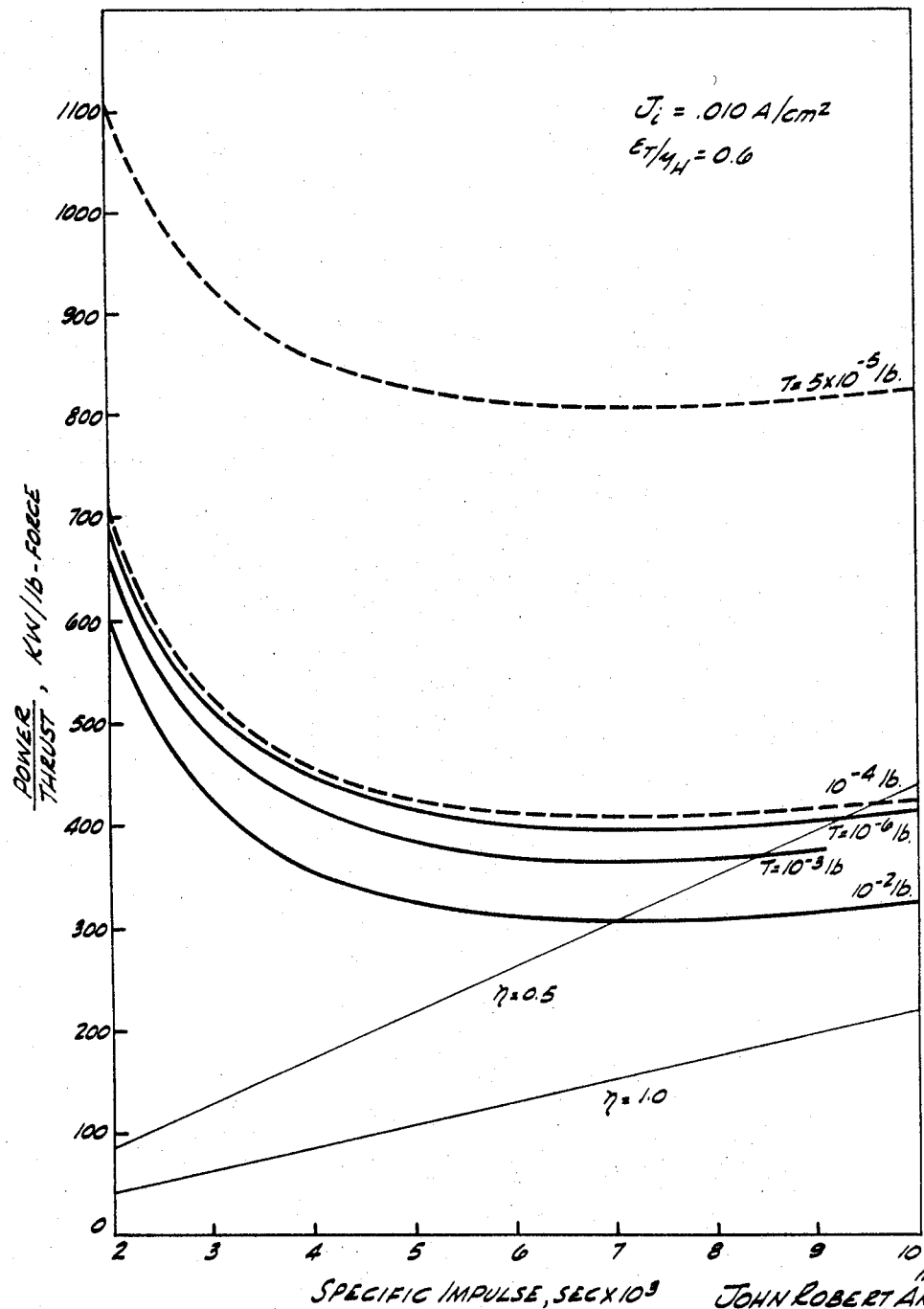

United States Patent Office 3,465,522
Patented Sept. 9, 1969

3,465,522
ION ROCKET
John Robert Anderson and George A. Work, Malibu, Calif., assignors to Hughes Aircraft Company, Culver City, Calif., a corporation of Delaware
Filed Mar. 9, 1965, Ser. No. 438,307
Int. Cl. F02k 9/06; F08h 1/00
U.S. Cl. 60—202
10 Claims

ABSTRACT OF THE DISCLOSURE

This invention relates to an ion engine, or rocket, and particularly to a contact ion engine using alkali metal vapor, such as cesium, as the propellant.

---

Among the uses for ion rockets or thrustors is that of attitude control and station keeping of a satellite, such as a communications satellite, including a synchronous earth satellite. Such as satellite requires an east-west station keeping means. This can be accomplished by the use of a small ion rocket generating thrust in the millipound range, or less. In such applications, the available power is at a preminum. Thus a major problem involved is to minimize the overall power requirements of the ion rocket.

In large ion rockets of the contact ionization type, thermal radiation from the porous ionizer is the major energy loss. This power loss generally is minimized by reducing the emitting area, which implies a high ion emission density for a given output beam current. Also, the propellant storage unit is customarily separated spatially from a flow control device or valvular element. The ionizer assembly is constructed as part of the electrostatic acceleration portion of the rocket, rather than as an integral part of the propellant feed system.

However, in the case of very small ion rockets, particularly those requiring a fuel capacity for one year, or more, producing thrust levels of about $10^{-3}$ pound force, or less prior requirements of the propellant feed system are the same order of magnitude as that required to heat the ionizer. Consequently, to obtain good efficiency, it becomes necessary to consider methods, other than reducing ionizing area, for minimizing power losses. In fact, the former method of raising the ionizer current density and reducing the ionizer area yields diminishing returns since any practical ionizer heater becomes a large portion of the volume of an ionizer assembly.

Accordingly, it is a primary object of this invention to provide an ion rocket having power requirements in this very low thrust regime.

Another important object of this invention is to provide an ion rocket having a thrustor feed system of low power requirements and maximum thermal efficiency.

A further object of this invention is to produce an ion rocket for use as an east-west station keeping means on a communication satellite.

Additional objects of this invention will become apparent from the following description, which is given primarily for purposes of illustration, and not limitation.

Stated in general terms, the objects of the invention are attained by providing an ion rocket which produces a directed thrust, such as in the range of from about $10^{-3}$ pound force, or lower, for example, by ionizing liquid metal vapor, such as cesium vapor, diffused through hot, porous refractory material, such as tungsten, and using electrostatic fields to accelerate the ions to a desired velocity. In the ion rocket of the invention, the propellant storage and the vaporizer elements are arranged as integral parts of a solenoid valvular unit so that some of the direct current power requirements of the solenoid coil are used to heat the propellant storage unit, thus eliminating the need for a separate heater unit and a separate power supply unit. In addition, in the ion rocket of the invention, the ionizer preferably is made an integral extension of the propellant feed system, rather than a part of the ion gun, to utilize normally wasted heat by conduction thereof from the high temperature ionizer to help heat the propellant to the vaporization temperature.

A more detailed description of a specific embodiment of the invention is given below with reference to the accompanying drawings, wherein:

FIG. 2 is a longitudinal sectional view of the engine of FIG. 1 drawn to a larger scale showing the integral relationship of the propellant storage and the vaporizer elements and the ionizer made an integral extension of the propellant feed system;

FIG. 3 is a graph illustrating the relationship of power per unit of thrust and thrust for prior art ion rockets and the ion rocket of the invention; and FIG. 4 is a graph illustrating the relationship of power per unit of thrust and specific impulse for prior art ion rockets and the ion rocket of the invention.

Figure 1:
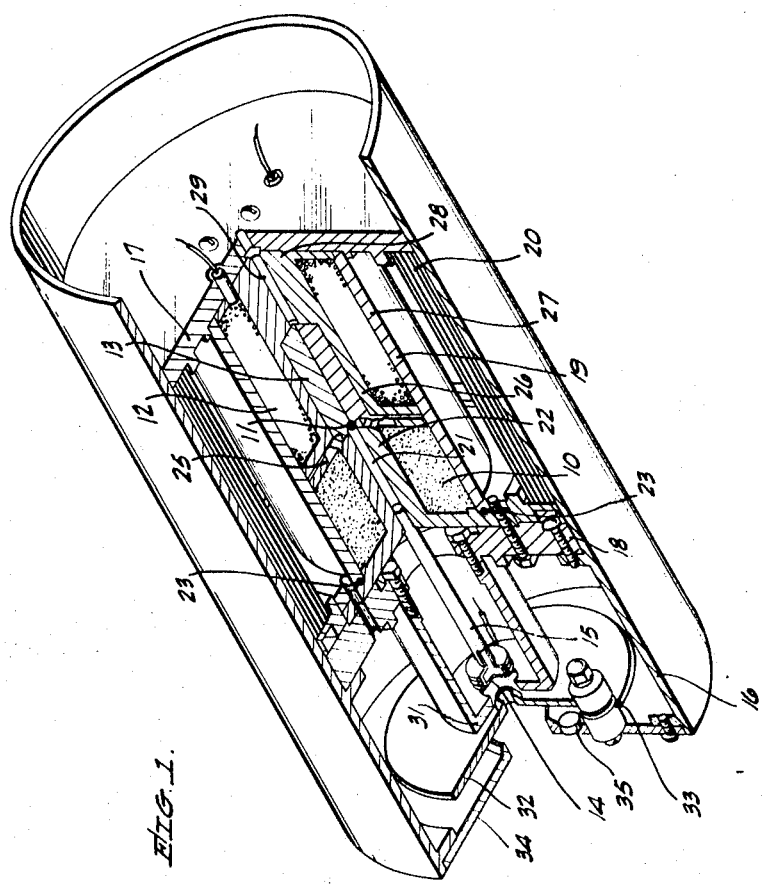
FIG. 1 is an isometric view, with a quadrant cut away, schematically showing an assembled ion engine.

The efficient, very low thrust contact-ion rocket system of the invention is attained as follows. The spatial distinctions between a liquid metal reservoir, vaporizer, flow control valve, feed tube and ionizer are eliminated. All these elements are brought into intimate contact, or integrally arranged or constructed so that thermal losses from heated elements can be used as input heat for other elements or components.

First, the liquid metal storage and vaporizer capillary volume 10, made of any low density foam, or porous material that is not subject to substantial chemical attack by the propellant, such as nickel foam, for example, is combined as an integral part of a solenoid flow control valve 11, associated with a solenoid 12. This construction has the distinct advantage that heating of the propellant can proceed through the use of power introduced into the valve solenoid coil 12, thus eliminating the need for a separate boiler or vaporizer heater. Furthermore, the steady state solenoid power required to raise the propellant to a desired temperature, such as 300° C., for example, can be such, that the magnetic plunger or valve poppet 13 of the feed valve 11 will not open until a peak current pulse is applied to the solenoid coil 12. Once the magnetic gap is closed, the same steady state solenoid current will then be sufficient to maintain the valve 11 in the open state and still continue to supply the necessary heat to maintain the propellant at the desired temperature.

Second, the propellant feed system and ionizer 14 are cooperatively associated or combined in a spatial and thermal sense by assembling the feed tube 15 and ionizer 14 as an integral extension of the flow control valve 11. This construction insures that heat conducted away from the ionizer is effectively utilized to heat the liquid propellant.

The engine unit shown in FIGS. 1 and 2 is an ion rocket embodying the features of the invention described immediately above. The feed tube 15 can be manufactured from refractory metals, such as tungsten, which are good thermal conductors and are inert to corrosion by alkali metals at elevated temperatures. In many instances the bulk of the heat for the propellant may be supplied by conduction from the ionizer 14, such as porous tungsten, so that the solenoid power may then be used effectively as a venier for the propellant operating temperature control. Ionizer 14 is heated electrically by power supplied from a power source (not shown) mounted in a satellite, for example.

The solenoid valve has three states of operation:
(1) No current in solenoid coil 12, valve 11 closed.
(2) Steady direct current in solenoid coil 12, valve 11 closed.
(3) Steady direct current in solenoid coil 12, valve 11 open.

Since the magnetic flux lines and reluctance of the gap between the valve poppet 13 and rear end pole piece 26 determine the solenoid current at which the magnetic force will be sufficient to open the valve 11, it is possible to design the valve to permit utilization of the steady state direct current power as a heater element for the propellant reservoir 10. The solenoid is opened by a current pulse on the order of 100 milliseconds. Once the valve 11 is open so that the magnetic gap between valve poppet 13 and pole piece 26 no loger exists, the previous steady state solenoid current is sufficient to maintain the valve 11 in the open state.

In actual practice, power conducted from the ionizer 14 through the feed tube 15 to the propellant reservoir-vaporizer 10 combination, can be the major power contribution to heating the propellant to the desired vaporization temperature. In this situation, power from the solenoid can be used as a vernier control to regulate the propellant temperature.

The ion rocket unit is mounted inside a housing cylinder 16 of aluminum or other suitable metal. Spaced circular ceramic discs 17 and 18 at opposite ends of housing 16 serve as mounting discs and impedance to heat losses by thermal conduction. A suitable ceramic for these discs is high purity aluminum oxide. The solenoid coil 12, capillary reservoir 10, valvular element 11, magnetic plunger 13, and auxiliary elements are mounted as a package inside a flanged Armco iron cylinder 19 which is suitably bolted to mounting disc 18, as shown. A cylindrical heat shield 20 of low thermal emissivity metal, such as tantalum or gold, is mounted around cylinder 19 and inside housing 16 for the purpose of minimizing thermal radiation losses.

The inlet end of feed tube 15 is brazed to the outlet end of a duct 21 formed centrally through a valve seat 22 made of a suitable metal, such as 17–4PH stainless steel. Valve seat 22 is sealed at an annular flanged portion thereof by a static vacuum seal 23 to the annular flanged portion of cylinder 19. Vaporizer capillary volume 10 of low density nickel foam is mounted tightly around valve seat 22 after cesium liquid has been introduced into the vaporizer volume 10 in an inert atmosphere. The inlet end of duct 21 is provided with a valve seat formed to seat ball valve 11 made of tungsten carbide, or other suitable material.

Ball valve 11 is centrally fixed to a circular diaphragm 24 of 0.005 inch thick 316 stainless steel having concentric circular corrugations to provide tensile force which normally maintains ball valve 11 seated under about 3 pounds force and the valve closed to flow of cesium vapor. Diaphragm 24 is sealed inside a nonmagnetic annular ring 25 of 316 stainless steel. Ring 25 is positioned snugly against vaporizer 10 with the aid of an annular step formed in the inside wall of cylinder 19.

A cylindrical Armco iron pole piece 26 provided with an annular flange is nicrobrazed to a nonmagnetic cylindrical segment 27 of 316 stainless steel which, in turn, is nicrobrazed to a solid cylindrical Armco iron pole piece 28 provided with a central vent passage 29 and an annular flange attached to ceramic disc 17. Pole piece 26, segment 27 and pole piece 28 form a spool provided with a central cylindrical hole extending to the middle of the spool to solid pole piece 28. Solenoid coil 12 is wrapped around spools 26, 27, 28. The resulting solenoid coil is ceramic potted and given a final cure at 700° C. Electric power is supplied to solenoid coil 12 from a power source (not shown) mounted in a satellite, for example.

Inside the cylindrical hole of spool 26, 27, 28 is slidably disposed a generally cylindrical valve poppet 13 of Armco iron provided with a recess to accommodate ball valve 11. The lines of magnetic force from solenoid coil 12 pass longitudinally through valve poppet 13 which has a sufficient clearance of about 0.006 inch, between valve seat 22 and solid pole piece 28 to slide back and forth from the open to the closed position, and vice versa, of ball valve 11. Vent 29 also extends through ceramic disc 17 to freely permit this sliding action of valve poppet 13 by approximately equalizing pressures on both sides of the diaphragm 24.

A cup-shaped focus electrode 31 is mounted on ceramic disc 18 and concentrically disposed around ionizer 14 and feed tube 15. Around feed tube 15 and inside focus electrode 31 is disposed a cylindrical heat shield 23 of low thermal emissivity refractory metal for the purpose of minimizing thermal radiation losses. An accel electrode 32 is concentrically aligned with focus electrode 31 with the aid of a mounting attachment 33. Mounting attachment 33 is, in turn, attached to a circular decel electrode 34 mounted on the end of cylindrical housing 16. Neutralizer 35 is a thermionic emitter filament, such as thoriated tungsten. It is attached to decel electrode 34 in position to supply neutralizing electrons to the ion beam to avoid space charge fields of the ejected ions resulting in image charges on the rocket and diminishing the rocket thrust.

In operation, the porous ionizer 14 is heated to a temperature above that required for efficient surface ionization at the operating ion current density (approximately 1400° K. for $J_1$=.010 A./cm.$^2$). At the same time a predetermined direct current power is applied to the valve solenoid coil 12 but with the coil current below that threshold value at which the valve 11 opens. After a transient period during which the propellant in reservoir 10 is heated by both power conducted from the ionizer 14 through tube 15 and from solenoid coil 12, the ion rocket is in the thermal ready state. High voltages are then applied to the ionizer 14, focus and accelerator electrodes 31 and 32 and the neutralizing filament 35 is turned on. The rocket is now in the electrical ready state. At this point a short pulse (~100 msec.) of direct current with peak amplitude sufficient to generate the magnetic field necessary to open the valve 11. With the valve 11 in the open state, propellant vapor flows by the valve seat through duct 21 and feed tube 15 and then diffuses through the porous ionizer 14. Surface ionization occurs at the surface of the porous refractory in ionizer 14. These ions are then accelerated to the desired velocity. Space charge of the ion beam is neutralized by electrons from the thermionic emitter filament 35. Ion beam current is sensed by the power supply (not shown) connected to the ionizer 14. This beam current is sampled and a signal is sent through a feedback loop to adjust power into the solenoid coil 12 in order to regulate the propellant temperature and thereby the flow rate of propellant to the ionizer 14. By this method the thrust produced by the exhaust beam is stabilized.

The following analysis relates to surface-contact ion rockets and shows the dependency of efficiency on the various power requirements and thrust levels. In particular, the need for new and novel design features will be demonstrated as embodied in the microthrust concept if one is to realize practical ion engines in the thrust regime less than about 10$^{-3}$ pound force.

The total power input to an ion rocket is:

$$P_T = P_o + P_a + P_i + P_n + P_{fs} \qquad (1)$$

where $P_o$ = ion beam power,
$P_a$ = accelerator electrode power drain,
$P_i$ = ionizer heater power,
$P_n$ = neutralizer power,
$P_{fs}$ = propellant feed system power.

In a properly designed ion engine $P_a$ and $P_n$ can be neglected. For larger ion rockets (i.e., $T \geq 10^{-3}$ pound force) $P_{fs}$ generally is a very small contribution to the total power and thus is not important in evaluation of the rocket system efficiency. However, as thrust levels decrease below about $10^{-3}$ pound force, the $P_{fs}$ becomes progressively more important.

Taking the above into consideration and introducing the ion beam current, $I_i$, and the final voltage, $V_f$, equation 1 becomes $$P_T = I_i V_f + P_i + P_{fs} \qquad (2)$$

If the "losses" are defined as $$L = P_i + P_{fs} \qquad (3)$$

then $$P_T = I_i V_f + L \qquad (4)$$

To the first order, the electrostatic acceleration of ions from an ion rocket results in an exhaust beam of constant velocity. Hence, application of Newton's Laws of Motion provide an expression for the force or thrust T of an ion rocket which is given by:

$$T = \frac{dm_i}{dt} v_i = \frac{dn}{dt} m_i I_s g = \frac{m_i}{e} g I_i I_s \qquad (5)$$

From energy considerations, the final beam voltage is $$V_f = \frac{1}{2} \frac{m_i}{e} v_i^2 = \frac{1}{2} \frac{m_i}{e} (gI_s)^2 \qquad (6)$$

where

T = thrust,
$v_i$ = exit velocity of the ions,
$t$ = time,
$n$ = particle density,
$I_s$ = specific impulse,
$m_i$ = mass of ion with charge $e$,
$g$ = acceleration of gravity.

Specific impulse $I_s$ is, in turn, defined as the total impulse divided by the total mass of the propellant used $$(I_s = Tt/M_p g)$$

or alternatively, as the velocity of ejected propellant divided by the graviational constant $(I_s = v_i/g)$.

The power-to-thrust ratio is then written, using Equations 4, 5 and 6 as $$\frac{P_T}{T} = \frac{gI_s}{2} + \frac{L}{\left(\frac{m_i g}{e}\right) I_i I_s} \qquad (7)$$

Under the assumption that no power "losses" occur in the acceleration process L represents only the power required for ion production. Furthermore, $L/I_i$ represents the energy required to create one ion:

$$\mathcal{L} = L/I_i \qquad (8)$$

Thus Equation 7 can be written $$\frac{P_T}{T} = \frac{gI_s}{2} + \frac{\mathcal{L}}{\left(\frac{m_i g}{e}\right) I_s} \qquad (9)$$

Therefore, the value of P/T depends on three variable factors: (1) the specific impulse of the exhaust, (2) the energy required to create one ion, and (3) the mass of the ion. A lower value of P/T implies greater efficiency of converting electrical energy to directed kinetic energy. If $\mathcal{L} = 0$ then we have the ideal case of 100% efficiency and the power-to-thrust ratio is given by $gI_s/2$.

The loss term L will now be evaluated for the case of a surface contact ion engine. The major power losses are those necessary to heat the ionizer and feed system, so $$L = \frac{\epsilon_T \sigma T_i^4 A_i}{\eta_H} + P_r + P_s + P_v \qquad (10)$$

where $\epsilon_T$ = total emissivity of ionizer surface,
$T_i$ = temperature of ionizer surface,
$\sigma$ = Stefan-Boltzmann constant,
$\eta_H$ = heating efficiency and is equal to ratio of power radiated from ionizer surface to the total heater power,
$P_r$ = propellant reservoir power,
$P_s$ = solenoid valve power,
$P_v$ = vaporizer power,
$A_i$ = ionizer surface area.

The energy required to generate one ion is therefore, $$\mathcal{L} = \frac{\epsilon_T \sigma T_i^4}{\eta_H J_i} + \frac{P_r}{I_i} + \frac{P_s + P_v}{I_i} \qquad (11)$$

The last two terms on the right hand side of Equation 11 are usually neglected in analyzing ion engine performance. Reservoir power is a function of the propellant mass that is being stored and heated, and therefore depends on the thrust level. Solenoid valve power and vaporizer power are essentially invariant with propellant mass. The reservoir power can be rewritten as, $$P_r = P_{ro} M_p \qquad (12)$$

where $P_{ro}$ = power per unit mass of propellant.
$M_p$ = total mass of propellant in reservoir.

The total propellant mass is dependent in beam current level and total time of beam exhaust or thrusting as, $$M_p = \frac{I_i}{e} m_i t \qquad (13)$$

Substituting for $I_i$ from Equation 5

$$M_p = \frac{eTm_i t}{m_i g I_s e} = \frac{Tt}{gI_s} \qquad (14)$$

Using Equations 14, 12, 11, Equation 9 for P/T becomes $$\frac{P_T}{T} = \frac{gI_s}{2} + \left(\frac{\sigma e}{m_i g I_s}\right)\left(\frac{\epsilon_T}{\eta_T}\right)\left(\frac{T_i^4}{J_i}\right) + \frac{P_{ro} t}{gI_s} + \frac{P_s + P_v}{T} \qquad (15)$$

Several features are to be noted with respect to Equation 15 and these are: (1) as the thrust level decreases, the loss terms $P_s + P_v/T$ increases and becomes the dominant loss in the microthrust regime, (2) the term for reservoir power loss, $P_{ro} t/gI_s$, increases linearly with time of operation (i.e., mass of propellant) and is inversely proportional to the specific impulse, and (3) the ionizer power loss term, $$\left(\frac{\sigma e}{m_i g I_s}\right)\left(\frac{\epsilon T}{\eta H}\right)\left(\frac{T_i^4}{J_i}\right)$$

decreases as the heating efficiency and current density increase.

Because of these considerations, the usual approach to ion rocket design, in which the feed system and thrustor are spatially and thermally separated to a great degree, is not a practical approach to the attainment of efficient thrust regime of less than about $10^{-3}$ pound force. In particular, since the loss term $P_s + P_v/T$ becomes so large at very low thrust levels, the microthrust ion rocket concept eliminates these losses by integrating the reservoir, vaporizer and solenoid valve into one compact unit in intimate contact with the ionizer feed tube so as to benefit from heat conducted away from the ionizer by this feed tube. This approach of compactly using both the valve solenoid power and normally waste heat conducted from the ionizer to raise the propellant to the required vaporizing temperature has the added benefit of increasing the efficiency of heating the reservoir and therefore reducing the valve of the other feed system loss term, $P_{ro} t/gI_s$, to practical levels.

That the above is a very important advance in the state of the art of surface-contact ion rockets, will now be demonstrated with P/T calculations for the cesium-contact ion engine. The numbers to be used are representative of the present state of the art, or are feasible extensions to near future performance. Assumptions:

(1) One year cesium supply in reservoir.
(2) Thrust time is one year.
(3) One hundred percent ionization efficiency.
(4) $\epsilon_T/\eta_H = 0.6$ (value of 0.63 has been realized in practice).
(5) $P_s + P_v = 10$ w. (state of art).
(6) $P_{ro} = .05$ w./g. (state of art).
(7) $T_i$ will be taken as the critical temperature for porous tungsten.

Returning to Equation 15 and designating each of the terms as:

$$\alpha = \frac{gI_s}{2}$$

$$\beta = \left(\frac{\sigma e}{m_i g}\right)\left(\frac{\epsilon_T}{\eta_H}\right)\left(\frac{T_i^4}{J_i}\right)\frac{1}{I_s}$$

$$\gamma = \frac{P_{ro} t}{gI_s}$$

$$\delta = \frac{P_s + P_v}{T}$$

Evaluating numerically to the variable parameter stage:

$\alpha = 2.28 \times 10^{-2} I_s$, kw./lb.-sec.

$\beta = 1.12 \times 10^{-9}\left(\frac{T_i^4}{J_i}\right)\left(\frac{1}{I_s}\right)$, kw.-sec./lb.

$\gamma = \frac{7.16 \times 10^{-5}}{I_s}$, kw.-sec./lb.

$\delta = \frac{10^{-2}}{T}$, kw./lb.

Case I $I_s = 6000$ sec., so that $\alpha = 131$ kw./lb., $\gamma = 119$ kw./lb.

P/T vs. T

| $J_i$ (A./cm.²) | $T_i^4/J_i$ | $\beta$ (kw./lb.) |
|---|---|---|
| .001 | 2.2×10¹⁵ | 410 |
| .003 | 8.8×10¹⁴ | 164 |
| .006 | 4.9×10¹⁴ | 91.4 |
| .010 | 3.3×10¹⁴ | 61.6 |
| .020 | 1.8×10¹⁴ | 33.6 |
| .030 | 1.35×10¹⁴ | 25.2 |
| .050 | 8.8×10¹³ | 16.4 |

| T (lb.) | $J_i$ (A./cm.²) P/T (kw./lb.) | | | | | | |
|---|---|---|---|---|---|---|---|
| | .001 | .003 | .006 | .010 | .020 | .030 | .050 |
| 1 | 10⁻² | 661 | 415 | 342 | 313 | 285 | 276 | 267 |
| 10 | 10⁻³ | 670 | 424 | 351 | 322 | 294 | 285 | 276 |
| 100 | 10⁻⁴ | 760 | 514 | 441 | 412 | 384 | 374 | 366 |
| 1,000 | 10⁻⁵ | 1,660 | 1,414 | 1,341 | 1,312 | 1,284 | 1,274 | 1,266 |
| 10,000 | 10⁻⁶ | (¹) | | | | | | (¹) |

¹ Too high to be of interest.

For the design concept embodied in this invention, the P/T values are those for $T = 10^{-2}$ lb. and increase logarithmically by approximately 80 kw./lb. to $10^{-6}$ lb. force.

Case II $J_i = .010$ a./cm.²

| $I_s$ (ksec.) | $\alpha$ (kw./lb.) | $\beta$ (kw./lb.) | $\gamma$ (kw./lb.) | $\alpha+\beta+\gamma$ (kw./lb.) | T=10⁻² P/T (kw./lb.) | 10⁻³ | 10⁻⁴ | 5×10⁻ |
|---|---|---|---|---|---|---|---|---|
| 2 | 43.7 | 185 | 359 | 588 | 589 | 598 | 688 | 1,088 |
| 3 | 65.5 | 123 | 239 | 427 | 428 | 437 | 527 | 927 |
| 4 | 87.5 | 92.5 | 179.5 | 360 | 361 | 370 | 460 | 860 |
| 5 | 109 | 74 | 144 | 327 | 328 | 337 | 427 | 827 |
| 6 | 131 | 61.6 | 120 | 312 | 313 | 322 | 412 | 812 |
| 7 | 153 | 53 | 103 | 309 | 310 | 319 | 409 | 809 |
| 8 | 175 | 46.3 | 90 | 311 | 312 | 321 | 411 | 811 |
| 10 | 218 | 37 | 72 | 327 | 328 | 337 | 427 | 827 |

The above numbers are representative of prior art in the ion rocket field. For the approach outlined herein, the increase in values of P/T is tolerable for a practical ion rocket at least to a thrust level of $10^{-6}$ lb. and probably even lower.

The comparison of the microthrust concept with prior art is presented in FIGS. 3 and 4 based on the above theory and state of the art numbers for feed system powers.

FIG. 3 is a plot of P/T vs. thrust for several different ionizer current densities at a constant specific impulse value of 6000 sec. The heating efficient parameter, $\epsilon_T \eta_H = 0.6$, is probably the best that can be realized practically with contemporary methods of radiation heating.

The dashed line curves are representative of what happens to the P/T value for prior art ion rockets as the thrust level is reduced to very low levels. The principal reason that these ion rockets become impractical at very low thrust, in terms of power requirements, is that a constant amount of power is required for valves and vaporizers which are separate elements from the propellant reservoir. Consequently, the loss term $P_s + P_v/T$ in Equation 15 becomes abnormally high.

On the other hand, in the case of the microthrust ion rocket which embodies the invention described herein, the above loss term is zero for any thrust level since the reservoir, feed valve and vaporizer are integrated into a single unit. The resultant P/T values for this new approach to ion rocket design is represented by the solid lines in FIG. 3. Some increase in the total P/T values occurs as the thrust decreases because the ratio of propellant mass to feed system mass decreases relatively fast, ionizer area and, therefore, power also decreases, which results in a moderate increase of $P_{ro}$, the power required to retain a unit mass of propellant at the necessary temperature. However, as contrasted with the prior art, the power required to generate thrust in the micropound regime is reasonable and results in a practical ion rocket.

FIG. 4 shows P/T plotted in a more conventional manner, namely vs. specific impulse. This graph is essentially a cross plot of FIG. 3 in the sense that the value of T is fixed while $I_s$ is the independent variable.

This graph shows also that as the thrust is decreased to very low levels the power required for prior art ion engines, as shown in the dashed lines, becomes impractically high. In addition, FIG. 4 shows that below $I_s \approx 4000$ sec. both approaches to the design of ion rockets result in inefficient operation, at least at this value of $J_i = .010$ a./cm.² ($\eta$ = efficiency = kinetic power in beam/total input power to rocket).

In summary, FIGS. 3 and 4, resulting from state of art calculations based on the theory outlined in the previous pages, show the considerable advance of the microthrust concept of the invention over the prior art in ion rocket design. This new and novel design approach results in practical ion engines of reasonably low power requirements for thrust levels on the order of $10^{-3}$ lb. force or lower.

Although the description of the invention was largely directed to its application to a contact ion engine using alkali metal vapors, such as cesium vapor, on refractory ionizers, such as ionizer 14, it will be understood that the invention is applicable to other types of ion engines or thrustors. For example, the integral arrangement of the propellant storage and the vaporizer element as an integral part of a solenoid valvular unit also is applicable to electron bombardment types of ion engines.

Obviously many other modifications and variations of the present invention are possible in the light of the above teachings. It is therefore to be understood that within the scope of the appended claims the invention can be practiced otherwise than as specifically described.

What is claimed is:

1. An ion rocket comprising:
   (A) storage and vaporizer means for storing a propellant material and for vaporizing said propellant material when heated by a heat source;
   (B) ionizer means including a heating element for heating the same to a temperature above that required for efficient ionization, said ionizer means being coupled to said storage and vaporizer means for ionizing said propellant material;
   (C) conduit means for conveying said propellant material from said storage and vaporizer means to said ionizer means, said means providing thermal conduction between said ionizer means and said propellant material in said storage and vaporizer means for heating said propellant material when said ionizer means is at said temperature;
   (D) valvular means disposed along said conduit means between said storage and vaporizer means and said ionizer means for controlling the flow of said propellant material to said ionizer means;
   (E) solenoid means coupled to said valvular means for actuating the same, said solenoid means being an integral part of said storage and vaporizer means;
   (F) said heat source for vaporizing said propellant consisting of said solenoid means and said ionizer heating element, the combined heat provided by said solenoid means and said ionizer heating element being at least sufficient to vaporize said propellant material; and
   (G) ion accelerator means spaced from said ionizer means for accelerating the ionized propellant material.

2. An ion rocket comprising:
   (A) storage and vaporizer means for storing an alkali metal propellant material and for vaporizing said propellant material when heated by a heat source;
   (B) ionizer means including a heating element for heating the same to a temperature above that required for efficient ionization, said ionizer means being coupled to said storage and vaporizer means for ionizing said propellant material;
   (C) conduit means for conveying said propellant material from said storage and vaporizer means to said ionizer means, said means providing thermal conduction between said ionizer means and said propellant material in said storage and vaporizer means for heating said propellant material when said ionizer means is at said temperature;
   (D) valvular means disposed along said conduit means between said storage and vaporizer means and said ionizer means for controlling the flow of said propellant material to said ionizer means;
   (E) solenoid means coupled to said valvular means for actuating the same, said solenoid means being an integral part of said storage and vaporizer means;
   (F) said heat source for vaporizing said propellant consisting of said solenoid means and said ionizer heating element, the combined heat provided by said solenoid means and said ionizer heating element being at least sufficient to vaporize said propellant material; and
   (G) ion accelerator means spaced from said ionizer means for accelerating the ionized propellant material.

3. An ion rocket comprising:
   (A) storage and vaporizer means for storing an alkali metal propellant material and for vaporizing said propellant material when heated by a heat source, said storage and vaporizer means including a propellant storage zone of porous material substantially inert to chemical attack by said alkali metal;
   (B) ionizer means including a heating element for heating the same to a temperature above that required for efficient ionization, said ionizer means being coupled to said storage and vaporizer means for ionizing said propellant material;
   (C) conduit means for conveying said propellant material from said storage and vaporizer means to said ionizer means, said means providing thermal conduction between said ionizer means and said propellant material in said storage and vaporizer means for heating said propellant material when said ionizer means is at said temperature;
   (D) valvular means disposed along said conduit means between said storage and vaporizer means and said ionizer means for controlling the flow of said propellant material to said ionizer means;
   (E) solenoid means coupled to said valvular means for actuating the same, said solenoid means being an integral part of said storage and vaporizer means;
   (F) said heat source of vaporizing said propellant consisting of said solenoid means and said ionizer heating element, the combined heat provided by said solenoid means and said ionizer heating element being at least sufficient to vaporize said propellant material; and
   (G) ion accelerator means spaced from said ionizer means for accelerating the ionized propellant material.

4. An ion rocket comprising:
   (A) storage and vaporizer means for storing an alkali metal propellant material and for vaporizing said propellant material when heated by a heat source, said storage and vaporizer means including a propellant storage zone of metal foam substantially inert to attack by said alkali metal;
   (B) ionizer means including a heating element for heating the same to a temperature above that required for efficient ionization, said ionizer means being coupled to said storage and vaporizer means for ionizing said propellant material;
   (C) conduit means for conveying said propellant material from said storage and vaporizer means to said ionizer means, said means providing thermal conduction between said ionizer means and said propellant material in said storage and vaporizer means for heating said propellant material when said ionizer means is at said temperature;
   (D) valvular means disposed along said conduit means between said storage and vaporizer means and said ionizer means for controlling the flow of said propellant material to said ionizer means;
   (E) solenoid means coupled to said valvular means for actuating the same, said solenoid means being an integral part of said storage and vaporizer means;
   (F) said heat source for vaporizing said propellant consisting of said solenoid means and said ionizer heating element, the combined heat provided by said solenoid means and said ionizer heating element being at least sufficient to vaporize said propellant material; and
   (G) ion accelerator means spaced from said ionizer means for accelerating the ionized propellant material.

5. An ion rocket comprising:
   (A) storage and vaporizer means for storing a cesium propellant material and for vaporizing said propellant material when heated by a heat source, said storage and vaporizer means including a propellant storage zone of nickel foam substantially inert to attack by said cesium;

(B) ionizer means including a heating element for heating the same to a temperature above that required for efficient ionization, said ionizer means being coupled to said storage and vaporizer means for ionizing said cesium propellant material;

(C) conduit means for conveying said propellant material from said storage and vaporizer means to said ionizer means, said means providing thermal conduction between said ionizer means and said propellant material in said storage and vaporizer means for heating said propellant material when said ionizer means is at said temperature;

(D) valvular means disposed along said conduit means between said storage and vaporizer means and said ionizer means for controlling the flow of said propellant material to said ionizer means;

(E) solenoid means coupled to said valvular means for actuating the same, said solenoid means being an integral part of said storage and vaporizer means;

(F) said heat source for vaporizing said propellant consisting of said solenoid means and said ionizer heating element, the combined heat provided by said solenoid means and said ionizer heating element being at least sufficient to vaporize said propellant material; and (G) ion accelerator means spaced from said ionizer means for accelerating the ionized propellant material.

6. An ion rocket comprising:
(A) storage and vaporizer means for storing a propellant material and for vaporizing said propellant material when heated by a heat source;

(B) ionizer means including a heating element for heating the same to a temperature above that required for efficient ionization, said ionizer means being coupled to said storage and vaporizer means for ionizing said propellant material;

(C) conduit means for conveying said propellant material from said storage and vaporizer means to said ionizer means, said means providing thermal conduction between said ionizer means and said propellant material in said storage and vaporizer means for heating said propellant material when said ionizer means is at said temperature;

(D) valvular means disposed along said conduit means between said storage and vaporizer means and said ionizer means for controlling the flow of said propellant material to said ionizer means;

(E) solenoid means coupled to said valvular means for actuating the same, said solenoid means being an integral part of said storage and vaporizer means;

(F) said heat source for vaporizing said propellant consisting of said solenoid means and said ionizer heating element, the combined heat provided by said solenoid means and said ionizer heating element being at least sufficient to vaporize said propellant material;

(G) focus electrode means cooperatively associated with said ionizer means for focusing an ion beam emitted from said ionizer means; and (H) ion accelerator means spaced from said ionizer means and downstream from said focus electrode means for accelerating the ionized propellant material.

7. An ion rocket comprising:
(A) storage and vaporizer means for storing a propellant material and for vaporizing said propellant material when heated by a heat source;

(B) ionizer means including a heating element for heating the same to a temperature above that required for efficient ionization, said ionizer means being coupled to said storage and vaporizer means for ionizing said propellant material;

(C) conduit means for conveying said propellant material from said storage and vaporizer means to said ionizer means, said means providing thermal conduction between said ionizer means and said propellant material in said storage and vaporizer means for heating said propellant material when said ionizer means is at said temperature;

(D) valvular means disposed along said conduit means between said storage and vaporizer means and said ionizer means for controlling the flow of said propellant material to said ionizer means;

(E) solenoid means coupled to said valvular means for actuating the same, said solenoid means being an integral part of said storage and vaporizer means;

(F) said heat source for vaporizing said propellant consisting of said solenoid means and said ionizer heating element, the combined heat provided by said solenoid means and said ionizer heating element being at least sufficient to vaporize said propellant material;

(G) focus electrode means cooperatively associated with said ionizer means for focusing an ion beam emitted from said ionizer means; and (H) electron emitter means adjacent said ion beam for supplying neutralizing electrons thereto; and (I) ion accelerator means spaced from said ionizer means and downstream from said focus electrode means for accelerating the ionized propellant material.

8. An ion rocket comprising:
(A) storage and vaporizer means for storing a cesium propellant material and for vaporizing said propellant material when heated by a heat source, said storage and vaporizer means including a propellant storage zone of nickel foam substantially inert to attack by said cesium;

(B) ionizer means including a heating element for heating the same to a temperature above that required for efficient ionization, said ionizer means being coupled to said storage and vaporizer means for ionizing said cesium propellant material;

(C) conduit means for conveying said propellant material from said storage and vaporizer means to said ionizer means, said means providing thermal conduction between said ionizer means and said propellant material in said storage and vaporizer means for heating said propellant material when said ionizer means is at said temperature;

(D) valvular means disposed along said conduit means between said storage and vaporizer means and said ionizer means for controlling the flow of said propellant material to said ionizer means;

(E) solenoid means coupled to said valvular means for actuating the same, said solenoid means being an integral part of said storage and vaporizer means;

(F) said heat source for vaporizing said propellant consisting of said solenoid means and said ionizer heating element, the combined heat provided by said solenoid means and said ionizer heating element being at least sufficient to vaporize said propellant material;

(G) focus electrode means cooperatively associated with said ionizer means for focusing an ion beam emitted from said ionizer means; and (H) ion accelerator means spaced from said ionizer means and downstream from said focus electrode means for accelerating the ionized propellant material.

9. An ion rocket comprising:
(A) storage and vaporizer means for storing a cesium propellant material and for vaporizing said propellant material when heated by a heat source, said storage and vaporizer means including a propellant storage zone of nickel foam substantially inert to attack by said cesium;

(B) ionizer means including a heating element for heating the same to a temperature above that required for efficient ionization, said ionizer means being coupled to said storage and vaporizer means for ionizing said cesium propellant material;

(C) conduit means for conveying said propellant material from said storage and vaporizer means to said ionizer means, said means providing thermal conduction between said ionizer means and said propellant material in said storage and vaporizer means for heating said propellant material when said ionizer means is at said temperature;

(D) valvular means disposed along said conduit means between said storage and vaporizer means and said ionizer means for controlling the flow of said propellant material to said ionizer means;

(E) solenoid means coupled to said valvular means for actuating the same, said solenoid means being an integral part of said storage and vaporizer means;

(F) said heat source for vaporizing said propellant consisting of said solenoid means and said ionizer heating element, the combined heat provided by said solenoid means and said ionizer heating element being at least sufficient to vaporize said propellant material;

(G) focus electrode means cooperatively associated with said ionizer means for focusing an ion beam emitted from said ionizer means;

(H) electron emitter means adjacent said ion beam for supplying neutralizing electrons thereto; and (I) ion accelerator means spaced from said ionizer means and downstream from said focus electrode means for accelerating the ionized propellant material.

10. A small thrust ion rocket for east-west station keeping of a communications satellite comprising:

(A) storage and vaporizer means for storing a cesium propellant material and for vaporizing said propellant material when heated by a heat source, said storage and vaporizer means including a propellant storage zone of nickel foam substantially inert to attack by said cesium;

(B) ionizer means including a heating element for heating the same to a temperature above that required for efficient ionization, said ionizer means being coupled to said storage and vaporizer means for ionizing said cesium propellant material;

(C) conduit means for conveying said propellant material from said storage and vaporizer means to said ionizer means, said means providing thermal conduction between said ionizer means and said propellant material in said storage and vaporizer means for heating said propellant material when said ionizer means is at said temperature;

(D) valvular means disposed along said conduit means between said storage and vaporizer means and said ionizer means for controlling the flow of said propellant material to said ionizer means;

(E) solenoid means coupled to said valvular means for actuating the same, said solenoid means being an integral part of said storage and vaporizer means;

(F) said heat source for vaporizing said propellant consisting of said solenoid means and said ionizer heating element, the combined heat provided by said solenoid means and said ionizer heating element being at least sufficient to vaporize said propellant material;

(G) focus electrode means cooperatively associated with said ionizer means for focusing an ion beam emitted from said ionizer means;

(H) electron emitter means adjacent said ion beam for supplying neutralizing electrons thereto; and (I) ion accelerator means spaced from said ionizer means and downstream from said focus electrode means for accelerating the ionized propellant material.

References Cited

UNITED STATES PATENTS

| | | | |
|---|---|---|---|
| 2,904,664 | 9/1959 | Rothacker | 219—10.51 X |
| 2,980,177 | 4/1961 | Glasson | 60—39.48 X |
| 3,014,154 | 12/1961 | Ehlers et al. | 60—35.5 X |
| 3,159,967 | 12/1964 | Webb | 60—35.5 |
| 3,180,084 | 4/1965 | Meeks | 60—35.5 |

CARLTON R. CROYLE, Primary Examiner

U.S. Cl. X.R.

219—10.51; 251—141

PO-1050
(5/69)

UNITED STATES PATENT OFFICE
CERTIFICATE OF CORRECTION

Patent No. 3,465,522     Dated September 9, 1969

Inventor(s)  J. R. ANDERSON, ET AL.

It is certified that error appears in the above-identified patent and that said Letters Patent are hereby corrected as shown below:

| | | |
|---|---|---|
| Column 2, | line 69 | Change "venier" to --vernier--. |
| Column 3, | line 16 | Change "loger" to --longer--. |
| Column 5, | line 45 | Change "graviational" to --gravitational-- |
| | line 56 | Equation (8) should read -- $\mathcal{L} = \dfrac{L}{I_i}$ --; |
| | line 60 | The last term of Equation (9) should read -- $\dfrac{\mathcal{L}}{\left(\dfrac{m_i g}{e}\right) I_s}$ --; |
| | line 69 | Change "L=0" to -- $\mathcal{L}=0$ --. |
| Column 6, | line 14 | The left-hand side of Equation (11), chan "L" to -- $\mathcal{L}$ --; |
| | line 58 | After "thrust" insert --generation--. |
| Column 7, | line 65 | Change "$J_i=.010$ a./cm.$^2$" to --$J_i=.010$ A./cm.$^2$--; |
| | lines 65 et seq. | The term appearing over the far right-hand column in the Table should read --$5 \times 10^{-5}$--. |
| Column 8, | line 13 | Change "$\epsilon_T \eta_H$" to --$\epsilon_T/\eta_H$--; |
| | line 49 | Change "a./cm.$^2$" to --A./cm.$^2$--. |
| Column 10, | line 15 | Change "themal" to --thermal--. |
| Column 12, | line 22 | After "means;" delete "and". |

SIGNED AND
SEALED
MAY 5 1970

(SEAL)
Attest:

Edward M. Fletcher, Jr.
Attesting Officer

WILLIAM E. SCHUYLER, JR.
Commissioner of Patents